June 1, 1937.  A. PUPIER  2,082,468
MEANS FOR PREVENTING OR STOPPING STOMACH SICKNESS, ESPECIALLY SEASICKNESS
Filed Nov. 30, 1932  3 Sheets-Sheet 1
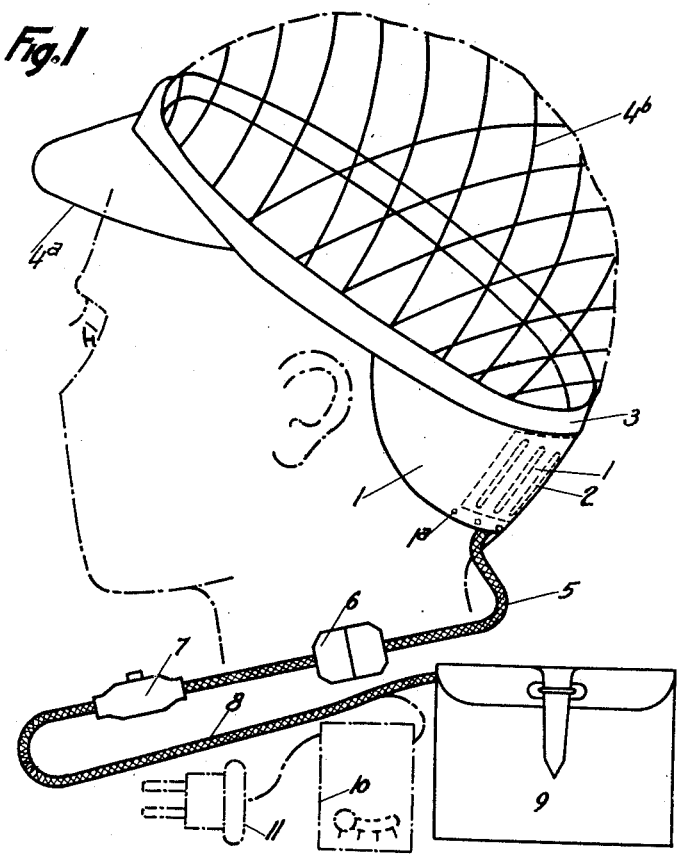
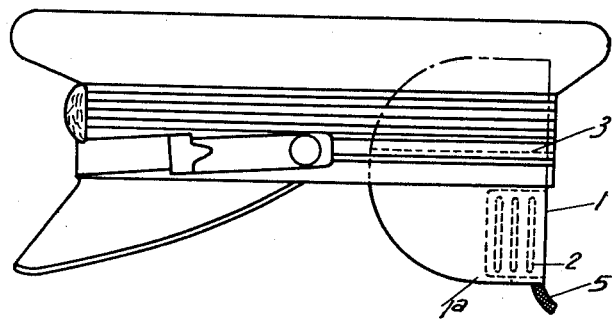
INVENTOR
André Pupier
BY Townsend+Decker
ATTORNEYS June 1, 1937.  A. PUPIER  2,082,468
MEANS FOR PREVENTING OR STOPPING STOMACH SICKNESS, ESPECIALLY SEASICKNESS
Filed Nov. 30, 1932    3 Sheets-Sheet 2

INVENTOR
André Pupier
BY Townsend + Decker
ATTORNEYS.

June 1, 1937.  A. PUPIER  2,082,468
MEANS FOR PREVENTING OR STOPPING STOMACH SICKNESS, ESPECIALLY SEASICKNESS
Filed Nov. 30, 1932    3 Sheets-Sheet 3
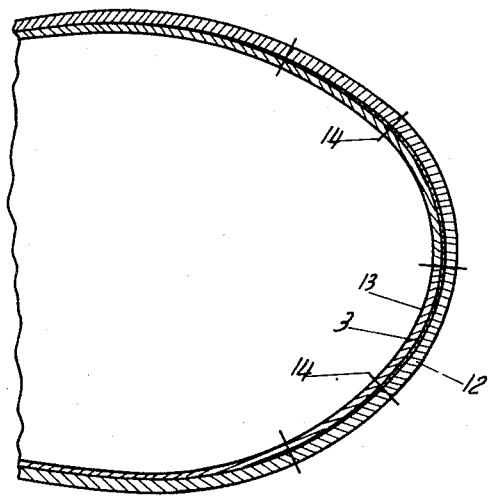
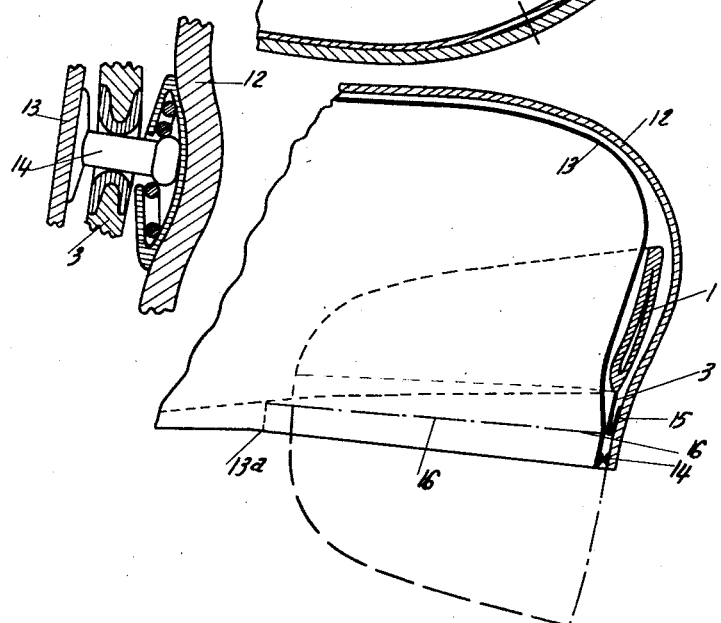

Patented June 1, 1937

2,082,468

UNITED STATES PATENT OFFICE 2,082,468

MEANS FOR PREVENTING OR STOPPING STOMACH SICKNESS, ESPECIALLY SEA-SICKNESS

André Pupier, Paris, France

Application November 30, 1932, Serial No. 644,986
In France December 2, 1931

6 Claims. (Cl. 128—254)

The invention relates to a device for preventing or stopping stomach sickness in general and more particularly the stomach sickness of pregnannant women, sea-sickness, stomach sickness on board aircraft, carriages, motor and other vehicles, as well as mountain sickness.

The device according to the invention essentially comprises a heating element disposed so as to be capable of heating the rachidian bulb (medulla oblongata) by the application of heat upon the region of the occipital foramen of the person suffering from stomach sickness.

Such heating of this region results in preventing or stopping the stomach sickness, more particularly sea-sickness.

According to the invention a heating element which is portable and is adapted to be carried by the user is combined with a carrying member in such a manne that said heating element may be applied to the base of the cranium opposite the occipital foramen when said carrying member is placed in its normal position upon the head of the user.

A feature of the invention resides in the constitution of the heating element in the form of a plate, preferably of small thickness, having a form adapted to cover and to fit closely the portion of the cranium which comprises, and is adjacent to, the occipital foramen, the said heating element being supported by a carrying member in the manner above referred to, for example, by any head-covering, hat, beret, bonnet, head-band, turban or the like.

It is understood of course that the expression "heating element" employed herein is to be construed as comprising either a heating element which is complete in itself in its simplest form, or comprises the combination of a heating element proper and a support to which it is fixed, or the combination of a heating element proper and an envelope in which it is placed either temporarily or permanently.

Another feature of the invention resides in the fact that the heating element is either flexible—in which case it may be provided with resilient members (whalebones, springs, straps, or the like) for imparting to it a certain curvature—or rigid, in which case it is first shaped to fit as exactly as possible the portion of the cranium which has to be heated. It may also be deformable, so that it may be curved to conform to the contour of the user's cranium.

The support of the heating element having a form adapted to cover the region of the occipital foramen may be constituted by several thicknesses of cloth, skin, leather or the like. The straight edge of the said support is preferably extended by a thin portion forming a band, which is either an extension of one of the pieces of cloth or the like of which the element is made, or a ribbon attached by sewing or the like. The provision of a thin portion forming an upward extension of the heating element enables the latter to be fixed better to the carrying member.

The carrying member may be constituted, for example by ribbons forming lateral extensions of the thin portion of the support of the heating element, or by an elastic band running round the head and possibly provided with an eye-shade, and, if necessary, with a net or the like fixed to the upper part of the elastic band and covering the top of the head.

In the case in which the carrying member is formed by a head-covering, for example: cap, hat, beret, head-band, turban or the like, the thin portion of the heating element comprises fixing means such as buttons, press-studs, clasps, sliding clasp fasteners or the like which permit the element to be attached to, or to be detached from, the head-covering.

Alternately the heating element may be sewn by its thin part to the inside of the head-covering. When the heating element is not in use, it may then be folded inside the head-covering.

The invention also provides an arrangement in which the heating element is so disposed that it is possible to conceal it inside the head-covering between the outer part of the head-covering and the lining or leather of the said head-covering, the said lining or leather being, separated from the actual head-covering opposite the fixing space for the heating element and being adapted to be connected to the said head-covering, apart from the operations of lowering and raising the heating element, by fixing means which may be the same as those of the heating element if the latter is detachable.

The particular arrangements which have just been described all permit the heating element to be used with any head-covering, as the thin part of the said element only constitutes a negligible extra-thickness and does not in any way interfere with the placing of the head-covering in position.

The heating element may possess a considerable capacity for storing heat, the heat losses being made good from time to time by means of a heating fluid, for example, air, vapour or water, which is renewed as the temperature falls below a predetermined limit.

A particular feature of the invention consists in the fact that the heating element comprises electric resistance, insulated electrically from the part of the cranium to which it is applied. The said resistance terminates externally either in a double conductor wire provided with a switch and leading to an electric plug-in device, or to an electric battery or battery of accumulators, or in a plug-in device to which the wire is connected.

It is preferable to employ low-voltage current in order to facilitate electric insulation and to render harmless any contact of the current with the patient in the case of deterioration of the insulation.

A small rheostat is inserted in the circuit of the wire supplying current to the heating element, for the purpose of regulating the temperature of the heating element. It is also possible to make any known combinations in the assembling of resistances. For example, the latter may be divided into two or three groups to provide the possibility of regulating the temperature of the heating element.

For employing alternating current taken from lighting or power supply means, a small transformer of the type of those already known in commerce for operating bells may be inserted in the circuit of the heating element, the said transformer being, if necessary, adapted in the well-known manner to provide a more or less low voltage, for example by the division of the primary or secondary winding into several sections which are connected in the circuit in greater or lesser numbers according to the voltage required.

Several possible constructional forms of the invention are shown by way of example in the accompanying drawings, wherein:

Figure 1 is a perspective view of a first constructional form of the invention.

Figure 4 is a horizontal section taken along the line A—A in Figure 3.

Figure 5 is a section of a detail on a larger scale.

Figure 6 is a section similar to Figure 3 in the case of a heating element fixed to the cap by a support which is adapted to be folded up.

Figure 7 shows the application of the invention as applied to a mariner's or aviator's cap.

Figure 2:
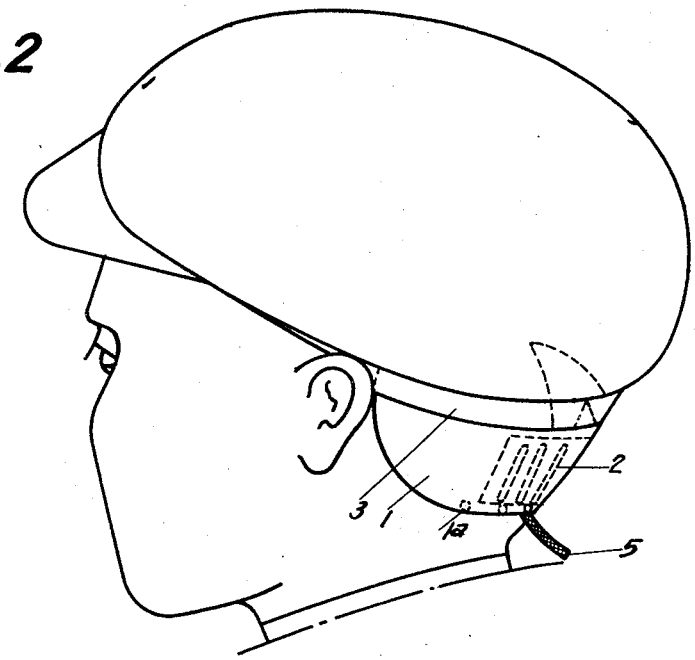
Figure 2 is a similar view of a second constructional form combined with a cap.

As shown in Fig. 1, the device according to the invention for preventing or stopping stomach sickness comprises essentially a heating element, comprising a pocketed pad formed for example of two layers of cloth 1, containing between them an electric heating element 2. The said two layers of cloth are joined together at their edges, except in the lower part, for a length corresponding to that of the heating element proper. They are provided at this place with closure means (press studs 1ª) so as to enable the heating element 2 to be introduced between the two layers of cloth, while allowing the wire supplying the heating element with current to pass through or to be withdrawn.

The support 1 is shaped substantially in the form of a segment so as to cover the region of the occipital foramen and the base of the cranium of the user. The effect of adhesion of the heating element on the region of the cranium in question is obtained in this case by a clamping effect due to the cut of the supporting cloth and the manner in which it is sewn.

The heating element is provided with attaching means to engage the head of the wearer, which attaching means comprises a thin portion or band 3 formed, for example, by the extension of one of the layers of cloth constituting the element 1.

The said thin portion 3 is extended laterally by an elastic attaching band 4 which may be fixed round the head as shown, and thus ensures the fixing of the heating element on the base of the user's cranium, without inconveniencing the movements of the head or preventing a head-covering being worn. The said elastic band is provided with an eye-shade 4ª. A net 4ᵇ fixed to the elastic band 4 and to the thin portion 3 rests on the top of the head.

The resistance 2 terminates in a conductor wire 5 provided with a plug-in device 6, a switch 7 which is one-way or multi-way, according as to whether the resistance 2 comprises only one heating wire or a plurality of heating wires in parallel for the purpose of providing different temperatures. The switch 7 is connected by the wire 8 to a portable accumulator battery 9.

In the case in which main alternating current is used, the arrangement shown in dot-and-dash lines in Fig. 1 may be employed. The said arrangement comprises a transformer 10 and plug-in device 11. By constructing the said transformer with several secondary windings, it is possible to vary at will the supply voltage of the heating element by a suitable grouping of the said windings.

In Figs. 2 to 6, the heating element according to the invention is shown combined with a head-covering. The heating element 1 which is similar to that shown in Fig. 1 and which is likewise provided in its upper part with a thin portion 3, here acts as an appendage extending the head-covering downwardly, and preferably formed of a material similar to that constituting the outer member 12 of the head-covering.

The heating element 1 is fixed to the back of the head-covering by means of any suitable temporary fixing devices for attaching the inner edge of the outer member 12 of the head-covering, the thin extension 3 of the heating element and the lining or leather 13 of the head-covering to one another. The thin extension 3 is then lodged between the cloth 12 and the lining or leather 13.

As temporary fixing means, it is possible to employ press studs such as 14 (Figs. 3, 4, and 5) disposed at the place of fixing the thin extension 3 to the head-covering, such that it is possible to join the lining 13 to the member 12 when the heating element is not in use.

Figure 3:
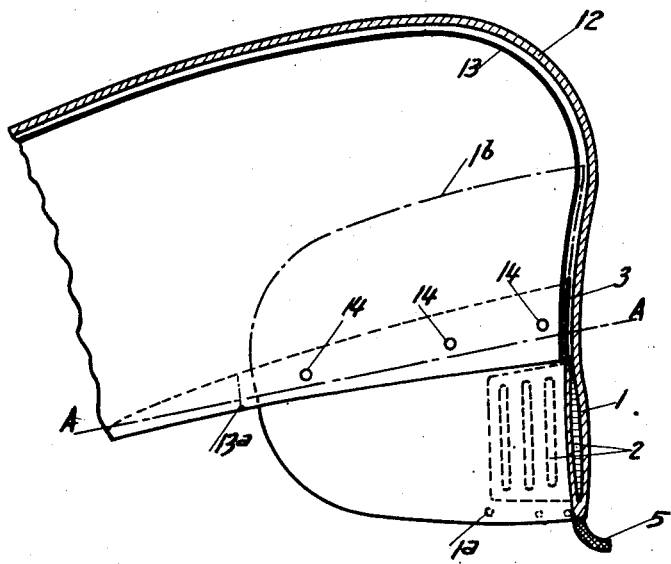
Figure 3 is a section showing the arrangement of a detachable heating element combined with a head-covering.

In Fig. 3, the heating element 1 is shown in full lines in its protective position. In order to conceal the element 1, the electric resistance 2 is withdrawn from its support 1 by opening the lower part of the support (see Fig. 1), then the press studs 14 are opened, the support 1 is removed and if desired is placed inside the head-covering (in the position 1ᵇ shown in dot-and-dash lines in Fig. 3), the holes of the thin extension 3 of the element 1 being again brought into coincidence with the press studs 14, whereupon the latter are closed so as to fix the lining 13. For this purpose, the said lining is sewn as far as 13ª and is free after that point, so that it is possible to detach it from the head-covering in its back part to allow the heating element 1 to pass through.

Fig. 6 shows a slightly different method of fixing the heating element 1 inside the head-covering. In this example, the thin extension 3 of the element is fixed by sewing at 15 to the inner rear surface of the head-covering at a certain height above the inner edge of the said head-covering. At 16 is indicated the line round which the heating element or merely its support may be lowered into the operative position (dot-and-dash lines) or may be raised into the head-covering into the inoperative position (full lines). Holes 17 are provided in this extension 3 or in the appendage, so that when the appendage is in its operative position, the said holes allow the shanks of the fixing means 14 to pass through.

In Fig. 7, the heating element 1 is fixed by its thin extension 3 to a mariner's or aviator's cap. This method of fixing, turning down or concealing the element or its support is the same as that indicated with reference to Figs. 2 to 6.

I claim:

1. In a device for use in applying heat to the region of the occipital foramen for preventing and stopping stomach sickness, the combination of a flexible support structurally shaped so as to closely cover the said region of the occipital foramen, a thin portion extending from the support at its upper part, an electrical resistance carried by the said support and of smaller dimensions than said support, said electrical resistance being separated from the outside by fabric in direct contact with the atmosphere towards the side where heat is to be applied to the region of the occipital foramen, a head-covering provided with a movable portion adapted to allow the support to pass between the rear portion of the head-covering and the said movable portion and fixing means provided on the thin extension of the support for detachably fastening the said support between the rear portion of the head-covering and the said movable portion.

2. In a device for use in applying heat to the region of the occipital foramen for preventing and stopping stomach sickness, the combination of a flexible support structurally shaped so as to closely cover the said region of the occipital foramen, a thin portion extending from the support at its upper part, an electrical resistance carried by the said support and of smaller dimensions than said support, said electrical resistance being separated from the outside by a layer of fabric in direct contact with the atmosphere towards the side where heat is to be applied to the region of the occipital foramen, a head-covering provided with a movable portion disposed in the interior of the said head-covering, the said movable portion being fixed permanently to the front part of the head-covering and detachably connected to the rear portion of the head-covering so as to allow the said support to pass therebetween and fixing means provided on the thin extension of the support for connecting the said support to the rear portion of the head-covering between the said head-covering and the inner movable portion.

3. In a device for use in applying heat to the region of the occipital foramen for preventing and stopping stomach sickness, the combination of a flexible support structurally shaped so as to closely cover the said region of the occipital foramen, a thin portion extending from the support at its upper part, an electrical resistance carried by the said support and of smaller dimensions than said support, said electrical resistance being separated from the outside by a layer of fabric in direct contact with the atmosphere towards the side where heat is to be applied to the region of the occipital foramen, a head-covering provided with a movable portion disposed in the interior of the said head-covering, the said movable portion being fixed permanently to the front part of the head-covering and detachably connected to the rear portion of the head-covering so as to allow the said support to pass therebetween and fixing means provided on the thin extension of the support for connecting the said support to the rear portion of the head-covering between the said head-covering and the inner movable portion, the said fixing means of the support co-operating with the fixing means of the said inner movable portion.

4. In a device for use in applying heat to the region of the occipital foramen for preventing and stopping stomach sickness, the combination of a flexible support structurally shaped so as to closely cover the said region of the occipital foramen, a thin portion extending from the support at its upper part, an electrical resistance carried by the said support and of smaller dimensions than said support, said electrical resistance being separated from the outside by a layer of fabric in direct contact with the atmosphere towards the side where heat is to be applied to the region of the occipital foramen, a head-covering provided with a movable portion formed with a flexible band adapted to embrace the lower part of the head-covering to allow the support to pass between the rear portion of the head-covering and the said movable portion and fixing means provided on the thin extension of the support for connecting the said support to the rear portion of the said movable portion between the said movable portion and the head-covering.

5. In a device for use in applying heat to the region of the occipital foramen for preventing and stopping stomach sickness, the combination of a flexible support formed with a pocket structurally shaped so as to closely cover the said region of the occipital foramen, a thin portion extending from the support at its upper part, an electrical resistance of smaller dimensions than the pocket and adapted to be fitted within and withdrawn from the said pocket, said electrical resistance being separated from the outside by a plurality of layers of fabric closely engaging each other and in direct contact with the atmosphere towards the side where heat is to be applied to the region of the occipital foramen, means for closing the pocket to removably confine the electrical resistance therein, a head-covering provided with a movable portion adapted to allow the support to pass between the rear portion of the head-covering and the said movable portion and fixing means provided on the thin extension of the support for detachably fastening the said support between the rear portion of the head-covering and the said movable portion.

6. In a device for use in applying heat to the region of the occipital foramen for preventing and stopping stomach sickness, the combination of a flexible support formed with a pad structurally shaped so as to closely cover the said region of the occipital foramen, a thin portion extending from the support at its upper part, an electrical resistance of smaller dimensions than the said pad and carried by the same, said electrical resistance being separated from the outside by a layer of fabric in direct contact with the atmosphere towards the side where heat is to be applied to the region of the occipital foramen, a head-covering provided with a movable portion adapted to allow the support to pass between the rear portion of the head-covering and the said movable portion and fixing means provided on the thin extension of the support for detachably fastening the said support between the rear portion of the head-covering and the said movable portion.

ANDRÉ PUPIER.